United States Patent
Jarvenpaa et al.

(10) Patent No.: US 11,125,998 B2
(45) Date of Patent: Sep. 21, 2021

(54) APPARATUS OR METHOD FOR PROJECTING LIGHT INTERNALLY TOWARDS AND AWAY FROM AN EYE OF A USER

(71) Applicant: Nokia Technologies Oy, Espoo (FI)

(72) Inventors: Toni Jarvenpaa, Akaa (FI); Erika Reponen, Tampere (FI); Andres Lucero, Tampere (FI); Akos Vetek, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/109,502

(22) PCT Filed: Dec. 15, 2014

(86) PCT No.: PCT/FI2014/050997
§ 371 (c)(1),
(2) Date: Jul. 1, 2016

(87) PCT Pub. No.: WO2015/101705
PCT Pub. Date: Jul. 9, 2015

(65) Prior Publication Data
US 2016/0327795 A1    Nov. 10, 2016

(30) Foreign Application Priority Data
Jan. 2, 2014    (GB) ..................... 1400012

(51) Int. Cl.
*G02B 27/01*    (2006.01)
*G02B 6/02*    (2006.01)
(Continued)

(52) U.S. Cl.
CPC ..... *G02B 27/0172* (2013.01); *G02B 6/02057* (2013.01); *G02B 27/0081* (2013.01);
(Continued)

(58) Field of Classification Search
CPC . G02B 27/0172; G02B 27/0176; G06F 3/167; G06F 3/017
See application file for complete search history.

(56) References Cited

U.S. PATENT DOCUMENTS

| 5,485,318 A | 1/1996 | Lebby et al. ................. 359/811 |
| 5,606,458 A * | 2/1997 | Fergason ........... G02B 27/0172 |
| | | 359/630 |

(Continued)

FOREIGN PATENT DOCUMENTS

| JP | 2008-225079 | 9/2008 | |
| WO | WO-2014032353 A1 * | 3/2014 | ......... G02B 27/0176 |

(Continued)

OTHER PUBLICATIONS

Cert, Vint, "Google Glass will "Probably" Need a "Very Visible" Recording Indicator", Glass Almanac, Sep. 5, 2013, 3 pgs.
(Continued)

*Primary Examiner* — Nitin Patel
*Assistant Examiner* — Robert M Stone
(74) *Attorney, Agent, or Firm* — Harrington & Smith

(57) ABSTRACT

An apparatus including an internal optical projection element configured to project light internally towards an eye of a user of the apparatus; an external optical projection element configured to project light externally away from an eye of the user of the apparatus; and one or more optical engines configured to provide light to the internal optical projection element and the external optical projection element. The apparatus preferably further includes a light guide with diffractive in and out-coupling elements and is configured as a head mounted display.

19 Claims, 3 Drawing Sheets

(51) Int. Cl.
*G02B 27/00* (2006.01)
*G06T 19/00* (2011.01)

(52) U.S. Cl.
CPC ........ *G02B 27/0093* (2013.01); *G06T 19/006* (2013.01); *G02B 2027/0138* (2013.01); *G02B 2027/0178* (2013.01)

(56) References Cited

U.S. PATENT DOCUMENTS

| | | | | |
|---|---|---|---|---|
| 5,805,120 | A * | 9/1998 | Yamada | A63F 9/0291 345/7 |
| 5,853,240 | A * | 12/1998 | Tanaka | G02B 27/0172 353/20 |
| 5,991,085 | A * | 11/1999 | Rallison | G02B 27/017 345/8 |
| 6,577,411 | B1 * | 6/2003 | David | G02B 3/10 351/159.41 |
| 8,548,290 | B2 * | 10/2013 | Travers | G02B 27/0081 385/37 |
| 8,982,471 | B1 * | 3/2015 | Starner | G02B 5/30 359/13 |
| 9,372,347 | B1 * | 6/2016 | Levola | G02B 27/0081 |
| 9,798,144 | B2 * | 10/2017 | Sako | G09G 5/10 |
| 2005/0168569 | A1 * | 8/2005 | Igarashi | A61F 9/08 348/62 |
| 2006/0072215 | A1 * | 4/2006 | Nishi | G02B 27/0172 359/708 |
| 2006/0132914 | A1 * | 6/2006 | Weiss | G02B 27/143 359/462 |
| 2006/0279662 | A1 * | 12/2006 | Kapellner | H04N 5/7416 348/744 |
| 2010/0277803 | A1 * | 11/2010 | Pockett | G02B 27/0172 359/567 |
| 2011/0122500 | A1 * | 5/2011 | Kobayashi | G02B 27/0172 359/633 |
| 2012/0068913 | A1 * | 3/2012 | Bar-Zeev | G02B 26/026 345/8 |
| 2012/0200488 | A1 * | 8/2012 | Osterhout | G06Q 30/02 345/156 |
| 2013/0147686 | A1 * | 6/2013 | Clavin | G06F 3/013 345/8 |
| 2013/0250503 | A1 | 9/2013 | Olsson et al. | 361/679.03 |
| 2014/0168784 | A1 * | 6/2014 | Hiraki | G02B 27/0176 359/630 |
| 2014/0340424 | A1 * | 11/2014 | Ellsworth | G02B 27/0172 345/633 |
| 2015/0015458 | A1 * | 1/2015 | Oho | G06F 3/011 345/8 |
| 2015/0219897 | A1 * | 8/2015 | Mukawa | G02B 27/0172 345/8 |
| 2015/0253573 | A1 * | 9/2015 | Sako | G06F 3/015 345/156 |
| 2015/0253574 | A1 * | 9/2015 | Thurber | G02B 27/0172 359/630 |
| 2016/0049108 | A1 * | 2/2016 | Yajima | A43B 3/0015 345/212 |
| 2016/0170283 | A1 * | 6/2016 | Kim | G02B 27/0093 348/211.2 |

FOREIGN PATENT DOCUMENTS

| | | | | |
|---|---|---|---|---|
| WO | WO-2014041871 | A1 * | 3/2014 | G09G 5/10 |
| WO | WO-2015081694 | A1 * | 6/2015 | G10L 15/26 |

OTHER PUBLICATIONS

Trenholm, R.; webpage http://www.cnet.com/uk/news/google-glass-spotted-at-mwe; Feb. 28, 2013 [accessed on Jun. 8, 2014]; whole document (12 pages).

Wikipedia; webpage https://web.archive.org/web/20131231055030/ https://en.wikipedia.org/wiki/Google_Glass; Dec. 31, 2013 [accessed on Nov. 22, 2017]; whole document (9 pages).

* cited by examiner

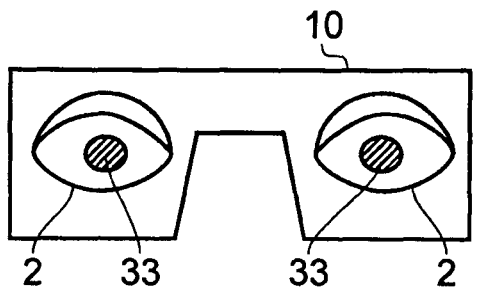
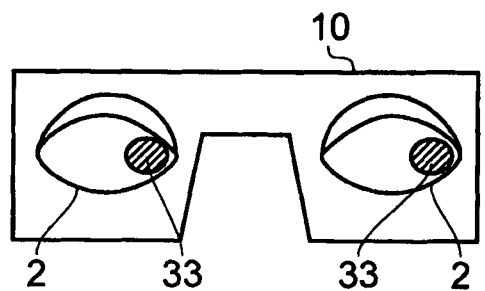
FIG. 8A    FIG. 8B
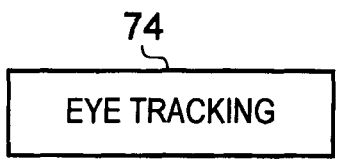
FIG. 9
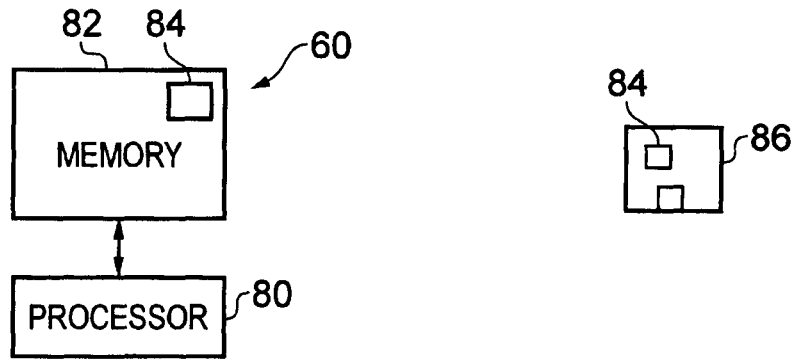
FIG. 10
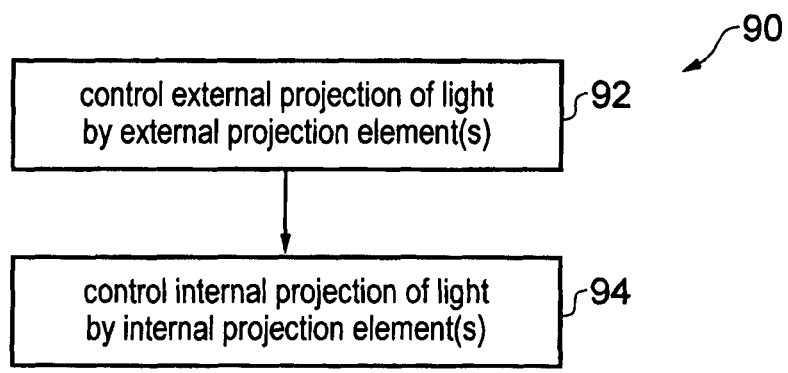
FIG. 11

APPARATUS OR METHOD FOR PROJECTING LIGHT INTERNALLY TOWARDS AND AWAY FROM AN EYE OF A USER

TECHNOLOGICAL FIELD

Embodiments of the present invention relate to an apparatus and/or a method for projecting light towards an eye of a user. In particular, some but not necessarily all embodiments relate to see-through displays.

BACKGROUND

Head mounted displays and near-eye devices project light internally towards an eye of a user. The projected light is controlled so that the user sees a virtual image. If the head mounted displays or near-eye devices are see through, then the virtual image appears as an additional overlay to the real-world image seen through the apparatus. Head mounted displays and near-eye devices may be monocular or binocular.

BRIEF SUMMARY

According to various but not necessarily all, embodiments of the invention there is provided an apparatus comprising:
an internal optical projection element configured to project light internally towards an eye of a user of the apparatus;
an external optical projection element configured to project light externally away from an eye of the user of the apparatus; and
one or more optical engines configured to provide light to the internal optical projection element and the external optical projection element.

According to various but not necessarily all embodiments of the invention there is provided a method comprising:
controlling one or more optical engines to provide light to an internal optical projection element configured to project light internally towards an eye of a user and to an external optical projection element configured to project light externally away from an eye of the user.

BRIEF DESCRIPTION

For a better understanding of various examples that are useful for understanding the brief description, reference will now be made by way of example only to the accompanying drawings in which:

FIGS. 8A and 8B illustrate the user wearing the apparatus as glasses;

FIG. 9 illustrates an example of an eye-tracking module;

FIG. 10 illustrates an example of the controller; and

FIG. 11 illustrates an example of a method.

DETAILED DESCRIPTION

Existing head mounted displays and near-eye display devices are primarily concerned with the projection of light internally towards an eye or eyes of a user. It would be desirable if these apparatus could, in addition, project light externally from the apparatus to provide information to a third party.

In some head mounted displays and near-eye devices, a camera or some other recording device may be integrated. In such circumstances, when a user of the apparatus is recording information, it may be desirable to provide an alert or warning to third parties. The projection of light externally away from the apparatus may be used to provide such a warning or alert.

Figure 1:
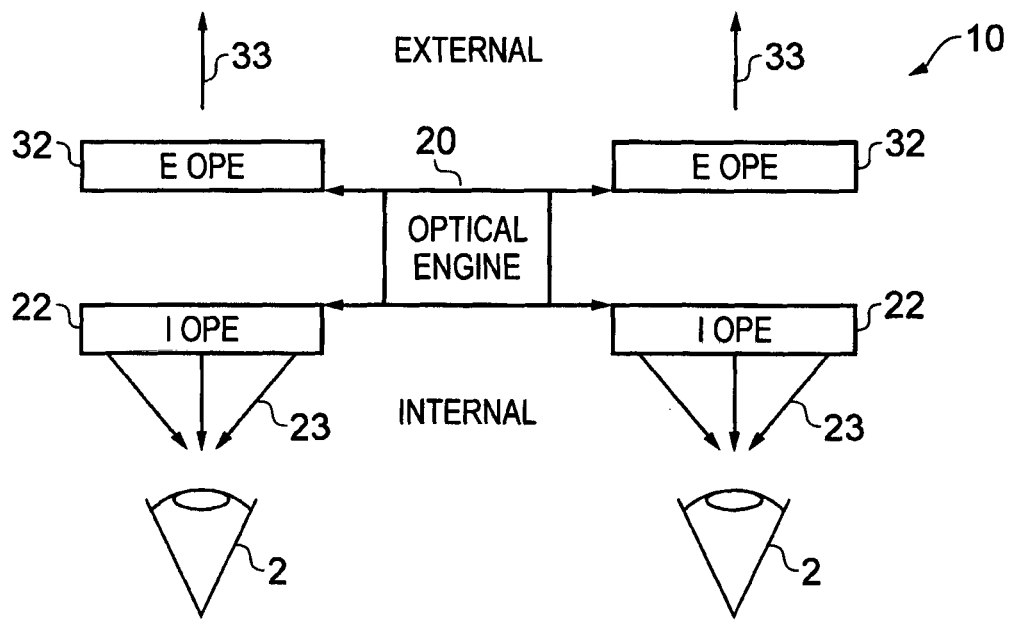
FIG. 1 illustrates an example of an apparatus that projects light internally towards an eye of a user and projects light externally away from an eye of the user.

FIG. 1 illustrates an example of an apparatus 10 that projects light 23 internally towards an eye 2 of a user of the apparatus 10 and projects light 33 externally away from an eye 2 of the user.

The apparatus 10 comprises a first internal optical projection element (TOPE) 22 configured to project light 23 internally towards an eye 2 of a user of the apparatus 10.

The apparatus 10 in this example, but not necessarily all examples, also comprises a second internal optical projection element (TOPE) 22 configured to project light 23 internally towards a second eye 2 of a user of the apparatus.

The apparatus 10 comprises a first external optical projection element (EOPE) 32 configured to project light 33 externally away from the first eye 2 of the user.

The apparatus in this example, but not necessarily all examples, comprises a second external projection element (EOPE) configured to project light 33 externally away from the second eye 2 of the user.

In this example, the first internal optical projection element 22 and the first external optical projection element 32 are both aligned with a left eye of a user and the second internal optical projection element 22 and the second external projection element 32 are both aligned with a right eye of the user.

Although in this example, the apparatus 10 is internally binocular and is configured to project light 23 internally to both the left eye and the right eye, in other embodiments the apparatus may be internally monocular and configured to project light 23 internally into only the left eye or the right eye. Also, in this embodiment, the apparatus 10 is configured to project light 33 externally away from the user from both the left eye and the right eye, however, in other examples it may be externally monocular and project light from only a single source, for example from in front of one of the eyes of the user.

In this example, an optical engine 20 is configured to provide light to the first external optical projection element 32, the second external optical projection element 32, the first internal optical projection element 22 and the second internal optical projection element 22.

The apparatus 10 may be a head mounted display (HMD) or a near-eye display (NED).

The apparatus 10 is preferably see-through such that the left eye of the user can see through both the first internal optical projection element 22 and the first external optical projection element 32 to see an external scene and the right eye of the user can see through both the second internal optical projection element 22 and the external optical projection element 32 to see an external scene.

The first and second internal optical projection elements 22 project light into the respective eyes of the user such that the user sees a virtual image.

Figure 2:
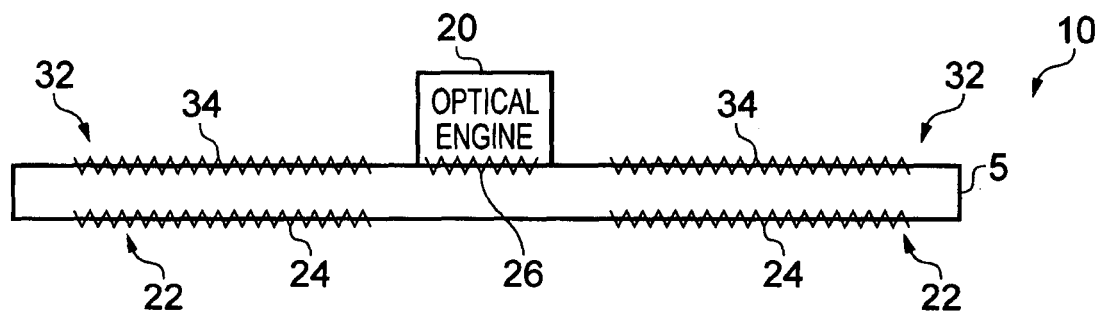
FIG. 2 illustrates an example of the apparatus, as illustrated in FIG. 1, comprising a common light guide.

FIG. 2 illustrates an example of the apparatus 10, as illustrated in FIG. 1. In this example a light guide 5 is used to transfer light from the optical engine 20 to the first and second external optical projection elements 32 and also to the first and second internal optical projection elements 22. That is a common light guide 5 is used for all of the optical projection elements. The light travels through the light guide 5 by total internal reflection.

If the apparatus 10 is a see-through apparatus then the light guide 5 should be transparent.

In this example, the light guide 5 is illustrated as a planar light guide. It may, however in some embodiments be desirable for the light guide to be curved or spherical.

In this example, the first external optical projection element 32 and the second external optical projection element 32 are positioned to project light from an external face of the light guide 5. The first and second external optical projection elements 32 are laterally offset such that they are generally aligned with the user's eyes.

Although the first external optical projection element 32 and the second external optical projection element 32 are illustrated as being on or adjacent the external face of the light guide 5, this need not be the case. The direction in which light is projected by an external optical projection element 32 may be controlled by, for example, its diffraction characteristics (grating angles, periods and depths). The external projection element(s) 32 need not be on or adjacent an external face of the light guide 5. In other examples, the external optical projection elements 32 could be adjacent or on an interior face or be in the inside of the light guide. The external optical projection element 32 is designated in this document and all examples as 'external' because it projects light externally not because it is or has to be physically located externally or on an external face.

The first internal optical projection element and the second internal optical projection element 22 are both located to project light from an internal side of the light guide 5. The first and second internal optical projection elements 22 are laterally offset such that they are generally aligned with the eyes of the user.

Although the first internal optical projection element 22 and the second internal optical projection element 22 are illustrated as being on or adjacent the internal face of the light guide 5, this need not be the case. The direction in which light is projected by an internal optical projection element 32 may be controlled by, for example, its diffraction characteristics (grating angles, periods and depths). The internal projection element(s) 24 need not be on or adjacent an internal face of the light guide 5. In other examples, the internal optical projection elements 22 could be adjacent to or on an exterior face or be in the inside of the light guide 5. The internal optical projection element 22 is designated in this document and all examples as 'internal' because it projects light internally not because it is or has to be physically located internally or on an internal face.

The optical engine 20 provides light to the light guide 5 via an in-coupling element 26. The in-coupling element may, for example, be a diffractive element such as, for example, a diffraction grating.

The in-coupled light is transferred by total internal reflection laterally along the light guide 5 to the optical projection elements 22, 32.

In this example, the internal optical projection elements 22 may be out-coupling elements 24. The out-coupling elements 24 may, for example, be diffractive elements such as, for example, diffractive gratings.

The out-coupling elements 24 may correspond to the in-coupling element 26 such that they both provide similar diffraction effects. In this scenario, the angle at which a light ray enters the in-coupling element 26 is also the angle at which the light ray exits the out-coupling element 24.

The lateral extent of the out-coupling element 24 may be greater than the lateral extent of the in-coupling element 26. In such circumstances, the out-coupling element 24 may be referred to as an exit pupil expander.

Further, there may be other optical elements on the light guide for controlling the light rays, such as intermediate optical elements for expanding the exit pupil also in a second direction.

Figure 3:
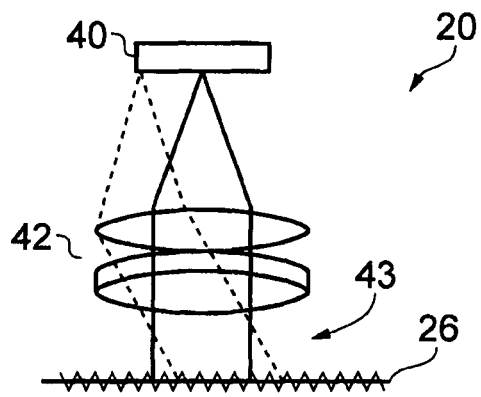
FIG. 3 illustrates an example of an optical engine.

FIG. 3 illustrates one example of an optical engine 20. In this example, the purpose of the light engine 20 is to represent a pixel of an image as a ray of light that enters the in-coupling element 26 at a particular angle.

The optical engine 20 comprises a light source 40 and optics 42. The light source 40 may be any suitable light source. It may be, for example, emissive, reflective or transmissive. In some examples, it may be a micro-display.

The light output by the light source 40 is refracted by optics 42 before being output from the optical engine 20. In the example illustrated, the output light 43 is incident upon an in-coupling element 26.

The optics 42 may be designed to collimate the light such that the light rays emanating from a particular pixel of the light source 40 exit the optics as a parallel light beam at a particular angle to the in-coupling element 26. In this way, different pixels of the light source 40 are associated with light rays at different incident angles at the in-coupling element 26, and as explained in the above paragraphs, this may then produce different exit angles for light rays associated with different pixels at the out-coupling elements 24.

The external optical projection elements 32, in FIG. 2, may be provided by out-coupling elements 34 at the light guide 5. In some examples, the out-coupling elements 34 may be diffractive elements, for example diffraction gratings. The out-coupling elements 34 may correspond to the in-coupling element 26 such that they both provide similar diffractive effects. In this scenario, light that enters the in-coupling element 26 of the light guide 5 at a particular angle exits the out-coupling elements 34 at the same angle.

Figure 4:
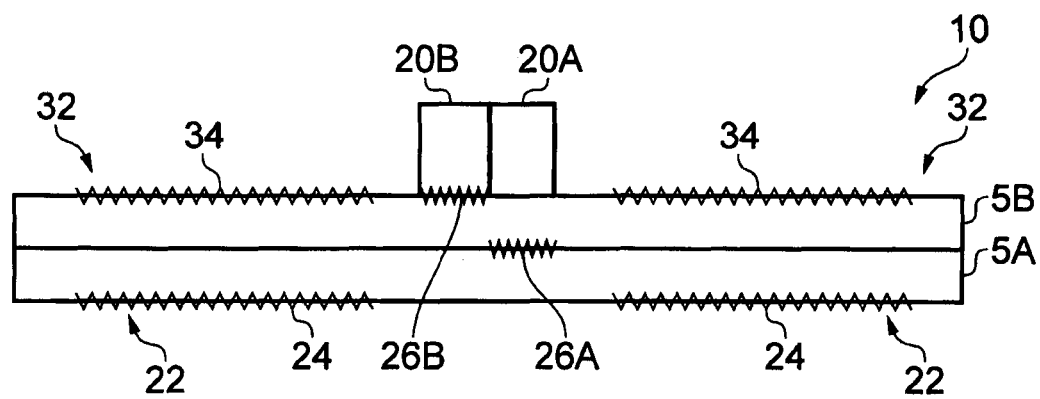
FIG. 4 illustrates an example of an apparatus, as illustrated in FIG. 1, comprising more than one light guide.

FIG. 4 illustrates an example of an apparatus 10, as illustrated in FIG. 1. This apparatus 10 uses a first light guide 5A to transfer light from an optical engine 20 to the first and second internal optical projection elements 22. That is a shared light guide 5A is used for all of the internal optical projection elements 22. In this example, the first light guide 5A comprises a first in-coupling element 26A. The first and second internal optical projection elements 22 are provided by first and second out-coupling elements 24 in the first light guide 5A.

The characteristics of the light guide, the in-coupling element, in this case the first in-coupling element 26A, and of the out-coupling elements 24 may be as described in relation to the equivalent features of FIG. 2.

In the example of FIG. 4, a second light guide 5B is used to transfer light from an optical engine 20 to the first and second external optical projection elements 32. That is a shared light guide 5B is used for all of the external optical projection elements 32.

In this example, the second light guide 5B comprises a second in-coupling element 26B. The first and second external optical projection elements 32 are provided by first and second out-coupling elements 34 in the second light guide 5B.

The characteristics of the light guide (second light guide 5B), the in-coupling element (second in-coupling element 26B) and of the out-coupling elements 34 may be as described in relation to the equivalent features of FIG. 2.

In some examples, a single common optical engine may be used to provide light to both the first in-coupling element 26A and the second in-coupling element 26B. However, in the example illustrated a first optical engine 20A is used to provide light to the first in-coupling element 26A and a different second optical engine 20B is used to provide light to the second in-coupling element 26B.

In the above descriptions of FIG. 2 and FIG. 4, it has been assumed that a single optical engine provides light to multiple optical projection elements 22, 32. However, it would be possible to use an optical engine for any number of optical projection elements including only a single optical projection element. It would therefore be possible to have one optical engine 20 associated with each of the optical projection elements or it may be possible for optical projection elements to share optical engines 20.

An optical engine 20 may be used to control the angular spread of the light 33 projected from the external optical projection element 32 to which it provides light. Where different optical engines 20 are used for different external optical projection elements 32, the angular spread of the light 33 projected from the first external optical projection element 32 may be controlled independently of the angular spread of the light 33 projected from the second optical projection element 32.

Figure 6:
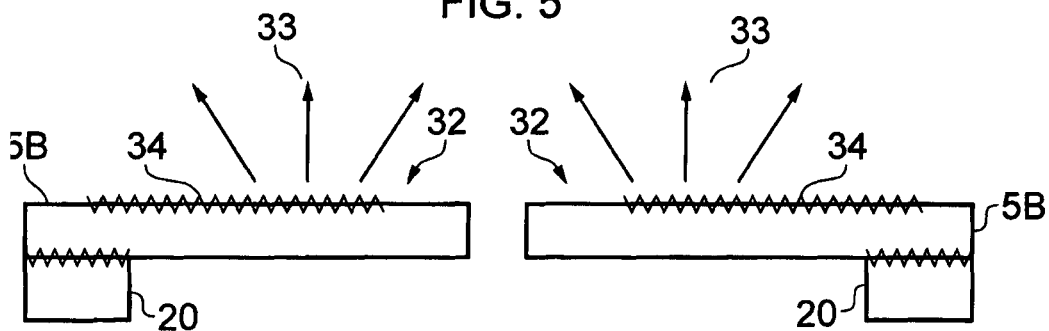
FIG. 6 illustrates an example similar to FIG. 5, however, comprising multiple light guides and respective optical controllers.

FIG. 6 illustrates an example, in which the first external optical projection element 32 is associated with its own separate light guide 5B and its own optical engine 20. The second external optical projection element 32 is associated with its own light guide 5B and its own optical engine 20. The light guide 5B for the first external optical projection element 32 and the light guide 5B for the second external optical projection element 32 are not optically coupled and are independent.

The angular spread of the light 33 projected from the first external optical projection element 32 may be controlled independently of the angular spread of the light 33 projected from the second optical projection element 32.

Figure 7:
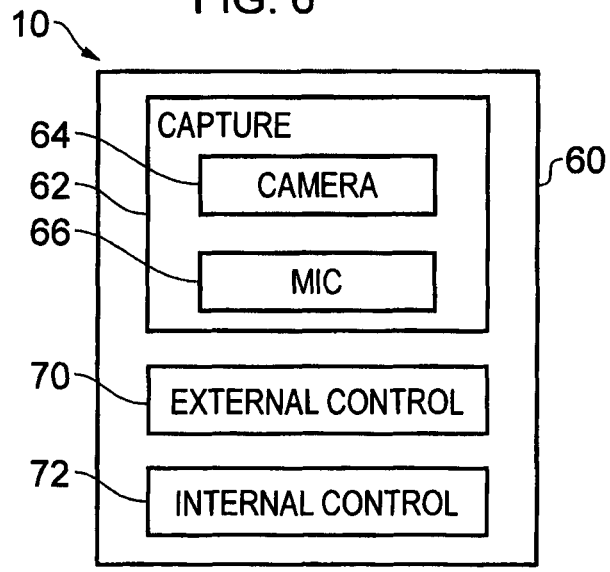
FIG. 7 illustrates an example of an electronic controller.

FIG. 7 illustrates an example of an electronic controller 60 for the apparatus 10. In this example, the electronic controller 60 has a capture interface 32 which communicates with media devices that capture media for example sound, images, video etc. The media devices that capture the media may be integrated as part of the apparatus 10, and may record the captured media in memory.

In this example, the capture interface 62 comprises a camera interface 64 and a microphone interface 66. However, in other examples it may comprise one or other of these interfaces or additional interfaces.

In this example the camera interface 64 communicates with a camera integrated as part of the apparatus 10 and the microphone interface 66 communicates with a microphone device integrated as part of the apparatus 10.

The controller 60 additionally comprises an external control interface 70 that controls one or more optical engines 20 and the projection of light 33 externally away from the user.

The controller 60 also comprises an internal control interface 72 which is configured to control one or more optical engines 20 to control the projection of light 23 internally towards an eye or eyes of the user.

The internal control interface 72 may, for example, control the projection of virtual images which a user of the apparatus 10 sees. This may be used to augment reality.

The external control interface 70 may be used to communicate information to a third party. For example, the external control interface 70 may control a colour of light projected by the external optical projection elements 32, control projection of a real image onto a real surface by the external optical projection elements 32, control projection of a virtual image to an external third party by the external optical projection elements 32, or control projection of information in the form of letters, symbols or script. The external control interface 70 may also provide time variation of the information provided by, for example, flashing a colour indicator or changing or scrolling projected text.

In some embodiments, the field of view of the camera may be received as data at the camera interface 64 and communicated to the external control interface 70. The external control interface 70 may then control the angular spread of the externally projected light 33 in dependence upon the field of view of the camera. Therefore as the camera is zoomed-in to create a narrower field of view, the angular spread of the light 33 projected externally may be controlled to have a narrower angular spread corresponding with the field of view of the camera. Likewise when the camera is zoomed out increasing its field of view, the angular spread of the light 33 projected may be controlled so that it is projected with an angular spread corresponding to the larger field of view of the camera.

There is a possibility that there may be some light leakage from the external optical projection elements 32 backwards internally towards the eyes of a user. This will therefore represent noise with respect to the light 23 projected internally by the internal optical projected elements 22. In these circumstances, it may therefore be desirable to increase the brightness of the internally projected light 23. The internal control interface 72 may therefore be responsive to operation of the external control interface 70 to increase or decrease the brightness of the internally projected light 23, and in particular increase the brightness when external projection of light is occurring. Also, it may be possible to block part of the internally leaked light by optical means, e.g. by using a properly aligned polarizer, or a switchable liquid crystal shutter synchronized with the external projection pulses.

FIGS. 8A and 8B illustrate the user wearing the apparatus 10 as glasses. In the example of FIG. 8A, the user is looking straight ahead and the light 33 output from the external optical projection elements 32 is controlled to coincide with areas corresponding to the pupils of the user's eyes 2. This may involve controlling its position and/or size. In FIG. 8B, the user is looking to their left and the light 33 projected by the external optical projection elements 32 is controlled to coincide with areas corresponding to the pupils of the user's eyes 2.

It will therefore be appreciated that the image produced by the externally projected light 33 may emulate pupils of the user's eyes and it tracks the actual pupils of the user's eyes. In this example, the controller 60 may additionally comprise an eye-tracking module 74, as illustrated in FIG. 9, that uses input from internally directed cameras or other eye tracking sensors to track the motion and position of pupils of the user's eyes. The output from the eye-tracking module 74 may then be provided to the external control interface 70 which controls the optical engine(s) 20 to change the characteristics of the externally projected light 33, and in particular, its apparent location to an external third party.

Figure 5:
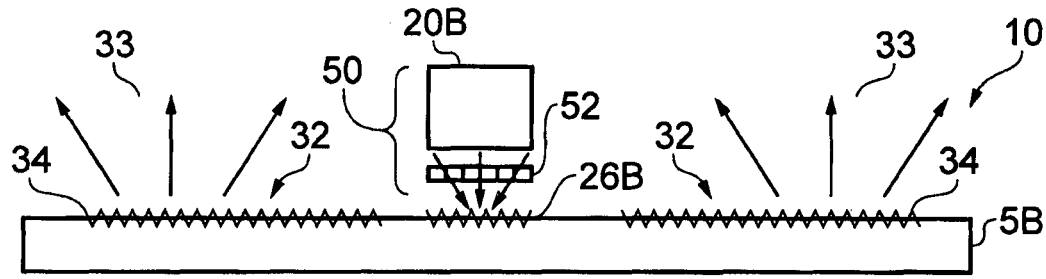
FIG. 5 illustrates a portion of the apparatus, as illustrated in FIG. 4, comprising an optical controller.

FIG. 5 illustrates only a portion of the apparatus 10 illustrated in FIG. 4. This is for the sake of clarity only.

The apparatus 10 illustrated in FIG. 5 may have the same features as described in relation to FIG. 4. It, however, comprises a selective optical filter 52 which selectively controls the output of the second optical engine 20B. The second optical engine 20B and the selective optical filter 52 in combination provide an optical controller 50.

In this example, the selective optical filter 52 is positioned between the output of the optical engine 20B and the in-coupling element 26B of the second light guide 5B. The purpose of the selective optical filter 52 is to control the light entering the in-coupling element 26B.

The selective optical filter 52 may be, for example, a liquid crystal display or other filter that selectively controls transmission of the light from the optical engine 20B to the in-coupling element 26B.

In the example illustrated, the selective optical filter 52 comprises a number of pixels which may be switched on or off. If a pixel is switched on it is transmissive and light from the optical engine 20B passes through that pixel to the in-coupling element 26B. If the pixel is off, it is opaque and light from the optical engine 20B cannot pass through it to the in-coupling element 26B.

Referring back to FIG. 3, it will be appreciated that by switching the pixels of the selective optical filter 52 on and off it is possible to control the angle of light rays entering the in-coupling element 26B and therefore control the angle of light rays exiting the out-coupling elements 34.

The optical controller 50 is therefore able to control the angular spread of the light 33 projected by the first and second external optical projection elements 32.

A similar effect may be achievable by controlling the output of the light source 40 within the optical engine 20B.

Also, a selective optical filer 52 is only an example of means for controlling the external projection of light by the external optical projection element(s) 32. Other examples of controlling the external projection of light by the external optical projection element(s) 32 include using a scanning laser engine or a pixel controllable reflective display.

The controller 60 may be configured to control the optical engine(s) 20 and, if present, selective filters 52.

Implementation of the controller 60 can be in hardware alone (a circuit, a processor), have certain aspects in software including firmware alone or can be a combination of hardware and software (including firmware).

The controller may be implemented using instructions that enable hardware functionality, for example, by using executable computer program instructions 84 in a general-purpose or special-purpose processor 80 that may be stored on a computer readable storage medium (disk, memory etc) to be executed by such a processor 80.

Referring to FIG. 10, the processor 80 is configured to read from and write to the memory 82. The processor 80 may also comprise an output interface via which data and/or commands are output by the processor 80 and an input interface via which data and/or commands are input to the processor 80.

The memory 82 stores a computer program 84 comprising computer program instructions (computer program code) that controls the operation of the apparatus 10 when loaded into the processor 80. The computer program instructions, of the computer program 84, provide the logic and routines that enables the apparatus to perform the methods illustrated in FIG. 11. The processor 80 by reading the memory 82 is able to load and execute the computer program 84.

FIG. 11 illustrates an example of a method 90 which may be performed by the controller 60, for example under the control of computer program 84.

At block 92, the method controls external projection of light from an external projection element 32 or from external optical projection elements 32.

At block 94, the method controls internal projection of light from an internal optical projection element 22 or from internal optical projection elements 22.

In this example of the method, block 94 follows block 92, implying that the control of the external projection of light and the internal projection of light is sequential. Although this may be the case, it may also be the case that blocks 92 and 94 are performed in parallel such that light is projected internally and projected externally simultaneously.

The method 90, may, for example, involve controlling a first optical engine 20A to provide light to the internal optical projection element(s) 22 and controlling a second optical engine 20B to provide light to the external optical projection element(s) 32.

The method 90 may involve controlling one or more first optical engines to provide light to a pair of internal optical projection elements 32, where each pair of internal optical projection elements is aligned with an eye of a user.

The method 90 may involve controlling one or more second optical engines 20B to provide light to a pair of external optical projection elements 32, where each of the pair of external optical projection elements 32 is aligned with an eye of the user (and an internal optical projection element 22).

As described in relation to FIGS. 5 and 6, the method 90 may involve selectively controlling pixels of an image provided to a light guide 5A, 5B, by the optical engine 20, 20B to control external projection of light 33. This control may, for example, be provided by controlling a selective optical filter 52 to filter light provided by the optical engine to the light guide.

As described in relation to FIG. 6, the method 90 may also comprise independently controlling projection of light 33 from a pair of external optical projection elements 32. As described in relation to FIG. 7, this control may be in response to a camera setting or other capture setting. As described in relation to FIGS. 8A, 8B and 9, this control may be in response to detecting eye movement.

The apparatus may therefore comprise:
at least one processor 80; and
at least one memory 84 including computer program code 84
the at least one memory 82 and the computer program code 84 configured to, with the at least one processor 80, cause the apparatus 10 at least to perform:
controlling one or more optical engines to provide light to an internal optical projection element configured to project light internally towards an eye of a user and to an external optical projection element configured to project light externally away from an eye of the user.

The computer program 84 may arrive at the apparatus 10 via any suitable delivery mechanism 86. The delivery mechanism 86 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 84. The delivery mechanism may be a signal configured to reliably transfer the computer program

84. The apparatus 10 may propagate or transmit the computer program 84 as a computer data signal.

Although the memory 82 is illustrated as a single component it may be implemented as one or more separate components some or all of which may be integrated/removable and/or may provide permanent/semi-permanent/dynamic/cached storage.

Although the processor 80 is illustrated as a single component it may be implemented as one or more separate components some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

As used here 'module' refers to a unit or apparatus that excludes certain parts/components that would be added by an end manufacturer or a user. The apparatus 10 may be a module or may be an end product.

The blocks illustrated in the FIG. 11 may represent steps in a method and/or sections of code in the computer program 84. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

The apparatus may, for example, be any type of near eye display (NED) device. The NED device may be see-through or not see-through (opaque).

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   an internal optical projection element for projecting light internally towards an eye of a user of the apparatus, wherein the internal optical projection element comprises a first out-coupling element;
   an external optical projection element for projecting light externally away from the eye of the user of the apparatus, wherein the external optical projection element comprises a second out-coupling element, and wherein the first and second out-coupling elements are diffractive elements;
   one or more optical engines for providing light simultaneously to the internal optical projection element and to the external optical projection element, wherein at least a portion of said one or more optical engines provides light to the internal optical projection element while a remainder of said one or more optical engines provides light to the external optical projection element;
   at least one light guide for transferring light from the one or more optical engines to the internal optical projection element and the external optical projection element; and
   one or more in-coupling elements used by the one or more optical engines to provide light to the at least one light guide for transferring light to the first and second out-coupling elements, wherein the one or more in-coupling elements are diffractive elements, wherein said internal optical projection element and said external optical projection element are disposed on said at least one light guide laterally from said one or more optical engines with said internal optical projection element aligned with said external optical projection element to share a common physical axis, so that, when said apparatus is used by the user with the eye of the user aligned with the common physical axis, said internal optical projection element and said external optical projection element are also aligned with the eye of the user.

2. The apparatus as claimed in claim 1, wherein the at least one light guide is a common light guide.

3. The apparatus as claimed in claim 1, wherein said at least one light guide comprises a first light guide for transferring light from one of said optical engines via one of the in-coupling elements to the internal optical projection element and a second light guide for transferring light from another of said optical engines via another of the in-coupling elements to the external optical projection element.

4. The apparatus as claimed in claim 1, further comprising:
a second internal optical projection element for projecting light internally towards a second eye of the user of the apparatus,
wherein the internal optical projection element and the second internal optical projection element are laterally offset from one another, and
wherein one light guide transfers light from one of said one or more optical engines to both the internal optical projection element and the second internal optical projection element.

5. The apparatus as claimed in claim 1, further comprising:
a second external optical projection element for projecting light externally away from a second eye of the user, wherein the external optical projection element and the second external optical projection element are laterally offset from one another.

6. The apparatus as claimed in claim 1, wherein the at least one light guide is transparent.

7. The apparatus as claimed in claim 1, wherein at least one of said one or more optical engines is configured to provide light, from different pixels, to at least one of said one or more in-coupling elements at different angles.

8. The apparatus as claimed in claim 7, wherein the at least one of said one or more optical engines comprises optics for providing collimated light, and wherein the at least one of said one or more optical engines comprises a microdisplay, a virtual image of which is projected via the internal optical projection element.

9. The apparatus as claimed in claim 1, further comprising a controllable optical filter for filtering light provided by at least one of said one or more optical engines.

10. The apparatus as claimed in claim 9, further comprising a second external optical projection element for projecting light externally away from a second eye of the user, said second external optical projection element comprising a second controllable filter for filtering light provided by one of said one or more optical engines, wherein the controllable filter and the second controllable filter are independently controlled.

11. The apparatus as claimed in claim 9, further comprising a controller for controlling projection of light by the external optical projection element, wherein the controller receives input from at least one of a camera or a pupil movement detector.

12. The apparatus as claimed in claim 1, further comprising a controller for controlling projection of light by the internal optical projection element to form at least one of text, colour, or an image.

13. The apparatus as claimed in claim 1, wherein the apparatus is configured as at least one of a see-through head-mounted display or a see-through near-eye device.

14. The apparatus as claimed in claim 1, wherein the diffractive elements have diffraction characteristics comprising grating angles, periods and depths.

15. The apparatus as claimed in claim 1, wherein the internal optical projection element is on or adjacent a first external face of the at least one light guide, wherein the external optical projection element is on or adjacent a second external face of the at least one light guide, and wherein the first and second external faces are opposite one another.

16. The apparatus as claimed in claim 15, wherein light travels through the at least one light guide by total internal reflection.

17. A method comprising:
disposing, in an apparatus, an internal optical projection element for projecting light internally towards an eye of a user, wherein the internal optical projection element comprises a first out-coupling element;
disposing, in the apparatus, an external optical projection element for projecting light externally away from the eye of the user, wherein the external optical projection element comprises a second out-coupling element, and wherein the first and second out-coupling elements are diffractive elements;
providing and controlling, in the apparatus, one or more optical engines to provide light simultaneously to said internal optical projection element and to said external optical projection element, wherein at least a portion of said one or more optical engines provides light to the internal optical projection element while a remainder of said one or more optical engines provides light to the external optical projection element;
providing, in the apparatus, at least one light guide for transferring light from the one or more optical engines to the internal optical projection element and the external optical projection element; and
providing, in the apparatus, one or more in-coupling elements used by the one or more optical engines to provide light to the at least one light guide for transferring light to the first and second out-coupling elements, wherein the one or more in-coupling elements are diffractive elements,
wherein said internal optical projection element and said external optical projection element are disposed on said at least one light guide laterally from said one or more optical engines with said internal optical projection element aligned with said external optical projection element to share a common physical axis, so that, when said apparatus is used by the user with the eye of the user aligned with the common physical axis, said internal optical projection element and said external optical projection element are also aligned with the eye of the user.

18. The method as claimed in claim 17, wherein at least one of said one or more optical engines is controlled to provide light to said internal optical projection element and to a second internal optical projection element.

19. The method as claimed in claim 17, wherein at least one of said one or more optical engines is controlled to provide light to said external optical projection element and to a second external optical projection element.

* * * * *